US012674812B1

(12) United States Patent
Berry

(10) Patent No.: US 12,674,812 B1
(45) Date of Patent: Jul. 7, 2026

(54) VEHICLE SPEED MONITORING DEVICE

(71) Applicant: Tiffany Berry, Lorton, VA (US)

(72) Inventor: Tiffany Berry, Lorton, VA (US)

( * ) Notice: Subject to any disclaimer, the term of this patent is extended or adjusted under 35 U.S.C. 154(b) by 357 days.

(21) Appl. No.: 18/376,685

(22) Filed: Oct. 4, 2023

(51) Int. Cl.
| *G01P 3/481* | (2006.01) |
| *G01P 1/02* | (2006.01) |
| *G07C 5/00* | (2006.01) |

(52) U.S. Cl.
CPC .............. *G01P 3/481* (2013.01); *G01P 1/026* (2013.01); *G07C 5/008* (2013.01)

(58) Field of Classification Search
CPC .. G01P 1/026; G01P 1/44; G01P 3/481; G01P 3/487; G07C 5/008; G01N 27/82; G01V 3/08; G01V 3/087; G01D 5/147; G01D 5/249; G01D 5/2451
See application file for complete search history.

(56) References Cited

U.S. PATENT DOCUMENTS

| 9,519,905 B2 | 12/2016 | Basir |
| 11,122,159 B1 | 9/2021 | Alsolami et al. |
| 11,597,282 B1* | 3/2023 | Thompson ............ B60L 3/0061 |

| 2016/0282154 A1* | 9/2016 | Goll ...................... G01D 11/245 |
| 2018/0024156 A1* | 1/2018 | Welsch .................. B60T 13/662 |
| | | 123/406.61 |
| 2018/0025636 A1* | 1/2018 | Boykin ............ G08G 1/096725 |
| | | 701/1 |
| 2022/0402482 A1* | 12/2022 | Sandrasekaran ... B60G 17/0185 |
| 2023/0316825 A1* | 10/2023 | Tokuda .................. B60C 23/062 |
| | | 701/32.9 |
| 2024/0141956 A1* | 5/2024 | Jeon ......................... G01P 1/026 |

FOREIGN PATENT DOCUMENTS

| CN | 203681288 | * | 7/2014 |
| WO | WO-2014095311 | * | 6/2014 |

* cited by examiner

*Primary Examiner* — Thang X Le
(74) *Attorney, Agent, or Firm* — Sanchelima & Associates, P.A.; Christian Sanchelima; Jesus Sanchelima

(57) ABSTRACT
A vehicle speed monitoring device including a housing assembly and a sensing assembly. The housing assembly includes a housing having a fastening member protruding thefrom. The sensing assembly includes an speed sensor. The speed sensor is located within the housing. The fastening member is used to fix the housing next to wheel hubs to permit measuring speed of the vehicle. A central processing unit can be used to process speed data from the speed sensor to determine erratic driving events and alert an external device, the erratic driving events include reaching predetermined speed, a predetermined acceleration in a predetermined time, a predetermined speed reduction in a predetermined time, a reduction of speed and no movement of the vehicle.

7 Claims, 3 Drawing Sheets

VEHICLE SPEED MONITORING DEVICE

BACKGROUND OF THE INVENTION

1. Field of the Invention

The present invention relates to a vehicle speed monitoring device, and, more particularly, to a vehicle speed monitoring device that is capable of monitoring speed and determining erratic driving events.

2. Description of the Related Art

Several designs for speed monitoring devices have been designed in the past. None of them, however, include wireless communication with external devices to alert a speed over the limit and erratic driving behaviors.

Applicant believes that a related reference corresponds to U.S. Pat. No. 11,122,159 issued for a smartphone control system that includes a GPS unit and a speed monitoring system. Applicant believes that another related reference corresponds to U.S. Pat. No. 9,519,905 issued for a system and method for monitoring a vehicle with a wireless mobile device to transmit driving characteristics to a central server. None of these references, however, teach of a vehicle speed monitoring device that is comprised of a vehicle monitoring sensor device that is coupled to a motor vehicle where the device monitors the vehicle's speed and driving behavior and wirelessly transmits the data to a smartphone device located in the vehicle which then relays the information to a parent or caregiver for processing; the device may also be used to provide emergency or medical alerts.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a vehicle speed monitoring device that includes tracking means to allow tracking location of a vehicle to determine speed limits where vehicle is.

It is another object of this invention to provide a vehicle speed monitoring device that includes reinforcement learning to learn driving patterns and compare the patterns with previous data to determine if the driving pattern is erratic.

It is still another object of the present invention to provide a vehicle speed monitoring device that includes a housing having a sensor which is installed in the vehicle.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
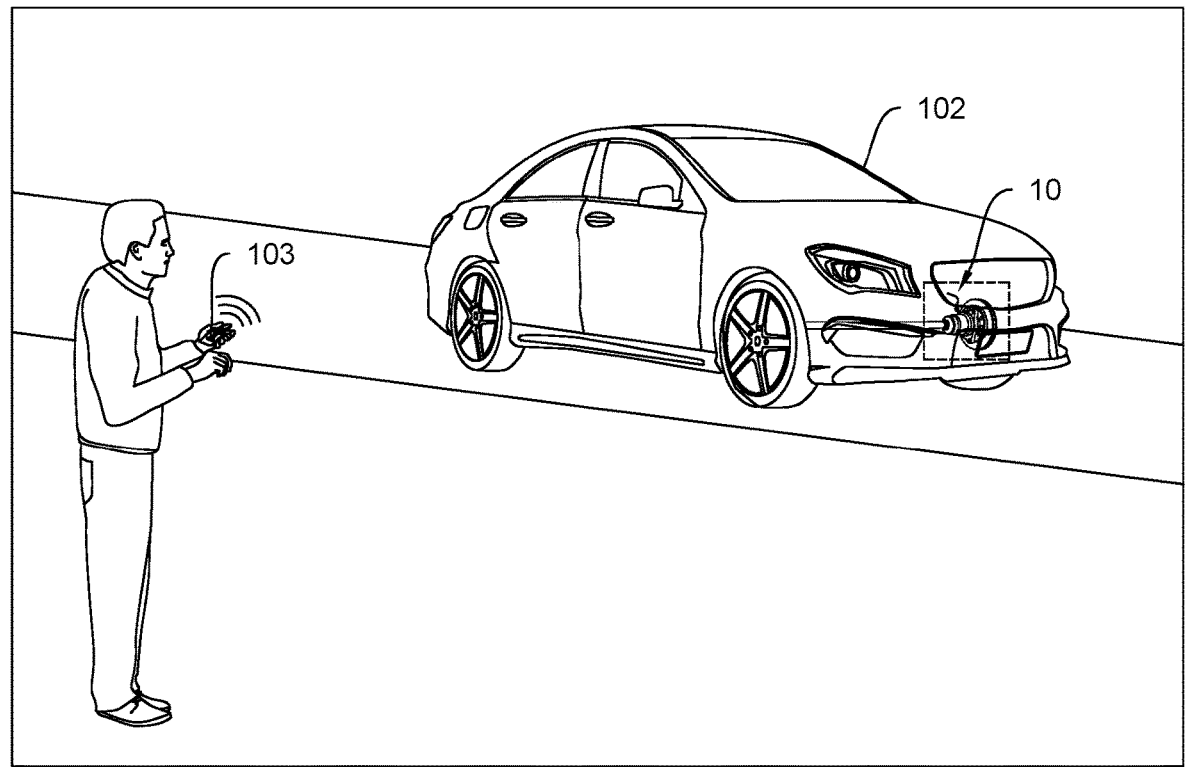
FIG. 1 represents an isometric operational view of vehicle 102 having the present invention 10 installed transmitting a signal to external device 103. The present invention is not illustrated in the present invention 10.
Figure 1A:
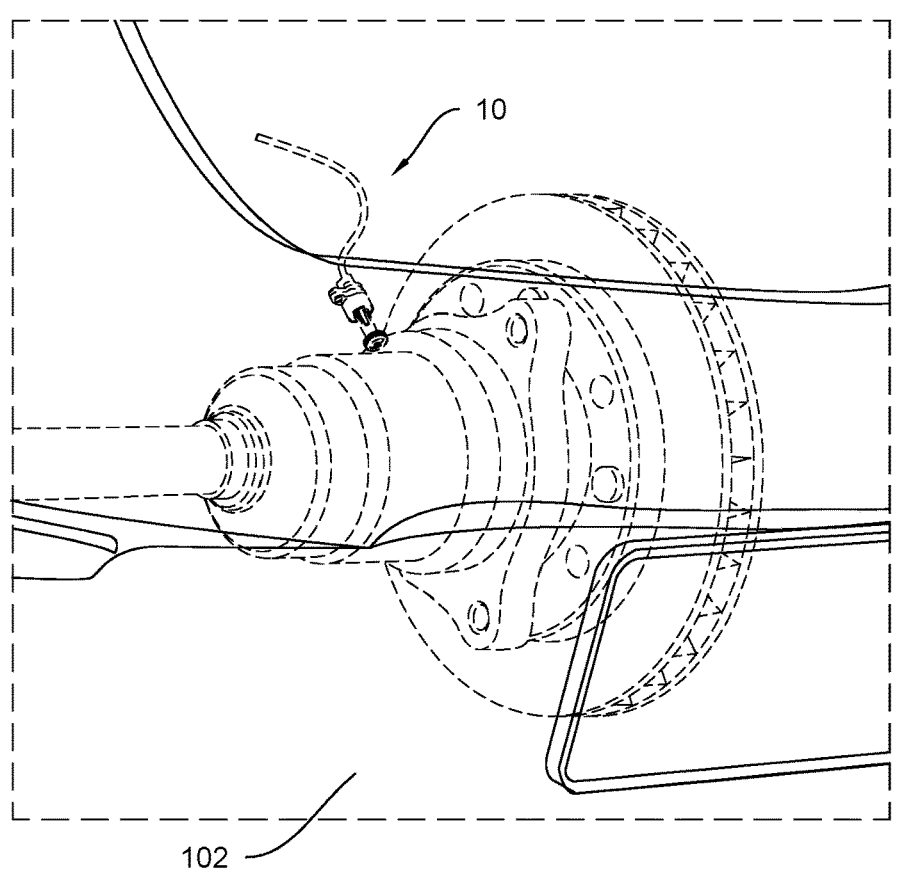
FIG. 1A depicts an enlarged see-through view of the present invention 10 installed in vehicle 102.

Referring now to the drawings, where the present invention is generally referred to with numeral 10, it can be observed that it basically includes a housing assembly 20 and a sensing assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
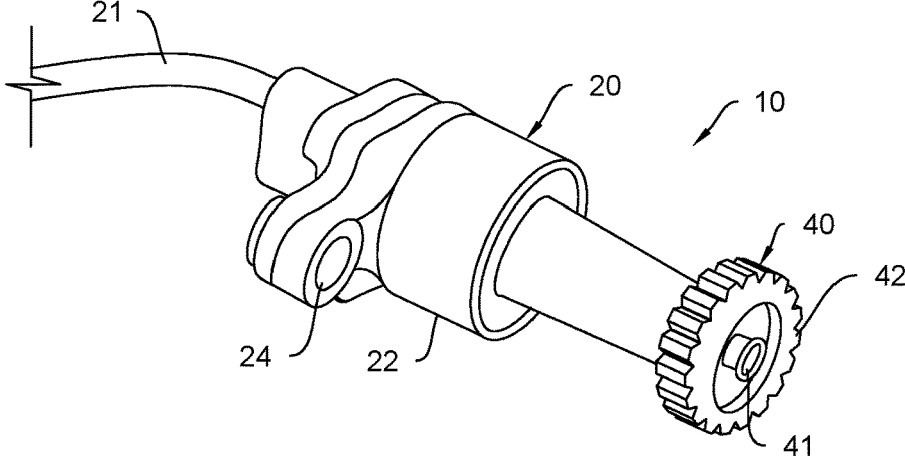
FIG. 2 shows an isometric view of the present invention 10. The present invention 10 may include a housing assembly 20 and a sensing assembly 40.

As best illustrated in FIG. 2, the housing assembly 20 may include a housing 22, a fastening member 24 and wire 21. As best illustrated in FIG. 2 the housing 22 may include a top portion and a bottom portion. The top portion of the housing 22 may substantially have a cylindrical shape having the fastening member 24 protruding perpendicular therefrom. Wire 21 may extend from a top end of the top portion of the housing 22. Wire 21 may be a power cord and a data transmission wire. Wire 21 may be adapted to connect with CPU of vehicle 102. The bottom portion of the housing 22 may have a truncated cone shape extending from the top portion of the housing, defining a housing 22 substantially having a conical elongated shape. It also may be suitable for the housing 22 to have a rectangular shape, a triangular shape, or any other suitable shape. The housing 22 may be made of stainless steel, aluminum, or any metal alloy. The housing 22 may be installed in a portion of vehicle 102 through the fastening member 24.

The fastening member 24 may be a metallic extension of the housing 22. The fastening member 24 may be made of stainless steel, or any resistant material. The fastening member 24 may substantially have a triangular bottom profile having a circular portion on a distal end thereof, the circular portion having an opening. A fastener may be inserted through the opening of the fastening member 24 to fix the present invention 10 to any portion of the vehicle 102. The fastening member 24 may be perpendicular to the top housing, as best illustrated in FIG. 3.

Figures 3, 4:
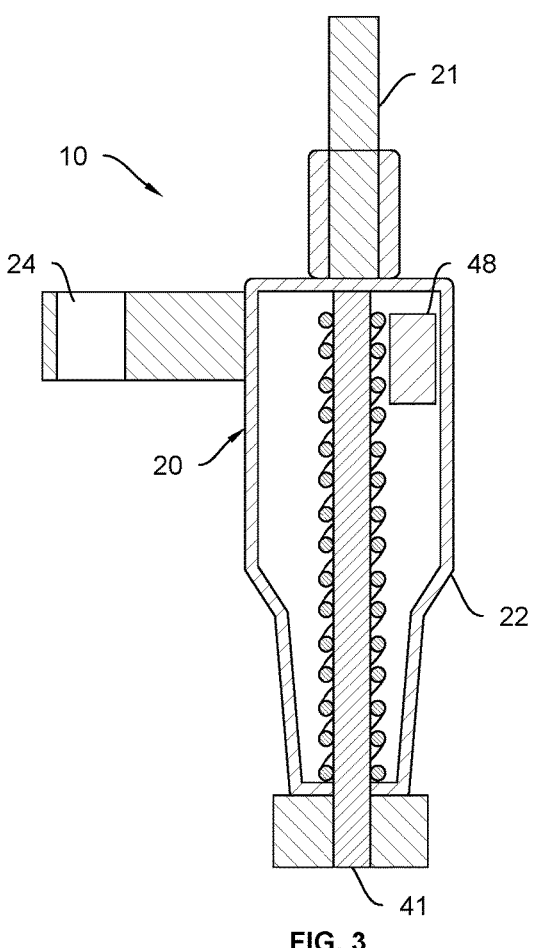
FIG. 3 illustrates a cross sectional view of the present invention 10.
FIG. 4 is a representation of a schematic view of the present invention 10.

Referring now to FIG. 3, it can basically be observed that the sensing assembly 40 may basically include an end cap 42, a sensor 42 and a tracking device 48. The end cap 42 may protect a protruding portion of the sensor 42, as best shown in FIG. 3. The end cap 42 may be made of stainless steel or any other resistant material.

The sensor 42 may be within the housing 22. In a preferred embodiment the sensor 42 may be an inductive speed sensor having an induction winding there in. In a preferred embodiment a signal from the rotating drive wheel is transmitted to a CPU. It also may be suitable for the sensor 42 to be a speed sensor with mechanical tenon, a speed sensor based on the Hall effect. It should be understood that any type of speed sensor may be used.

The tracking device 48 may be within the housing 42. The tracking device 48 may use GPS technologies to track the location of the vehicle 102. The data collected from the sensing device 41 and the tracking device 48 may be transmitted to a Central Processing Unit (CPU) 51 by means of the wire 21. In some embodiments, data of the sensing device and tracking device 48 may be sent to an external processor. CPU 51 may include algorithms to determine erratic driving events, where erratic driving events may include but is not limited to a predetermined speed, a predetermined acceleration in a predetermined time, a pre-determined speed reduction in a predetermined time, a reduction of speed and no movement of the vehicle. The tracking device 48 may indicate position of the vehicle 102 and speed limit established for such position, in such a way that a speed above the speed limit can be determined being also an erratic driving event. The CPU 51 may transmit a signal by means of a transmitter 53 to an external device 103 if erratic driving event is detected. It should be understood that the CPU 51 may be the CPU of the vehicle 102, an external processor, or an additional processor within vehicle 102. It should be understood that the housing 20 may be fixed separated a predetermined distance on the wheel hubs, near the brake rotors so the speed of the gears in the transmission system of the vehicle 102 can be measured.

The foregoing description conveys the best understanding of the objectives and advantages of the present invention. Different embodiments may be made of the inventive con-cept of this invention. It is to be understood that all matter disclosed herein is to be interpreted merely as illustrative, and not in a limiting sense.

What is claimed is:

1. A vehicle speed monitoring device, comprising:
   a housing assembly including a housing having a top portion and a bottom portion, said top portion having a cylindrical shape, said bottom portion having a trun-cated cone shape extending from said top portion, and a fastening member protruding perpendicularly out-wardly from said top portion of said housing, said fastening member having a triangular bottom profile and a circular opening on a distal end thereof, said housing assembly further including a wire extending from said top portion, said wire being adapted to connect with a central processing unit of a vehicle; and
   a sensing assembly disposed within said housing, said sensing assembly including a speed sensor and a track-ing device, said speed sensor being an induction sensor having an induction winding therein, said tracking device being configured to determine a position of said vehicle and a speed limit established for said position, wherein said fastening member is configured to fix said housing next to wheel hubs of said vehicle near brake rotors with a distal end of said bottom portion placed parallel to said wheel hub to permit measuring a speed of gears in a transmission system of said vehicle, wherein a central processing unit is configured to receive speed data from said speed sensor via said wire and location data from said tracking device, said central processing unit further configured to apply reinforce-ment learning to learn driving patterns of said vehicle and compare said driving patterns with previous driv-ing data to determine erratic driving events, said erratic driving events including at least one of reaching a predetermined speed, a predetermined acceleration in a predetermined time, a predetermined speed reduction in a predetermined time, a reduction of speed and no movement of the vehicle, and a speed of the vehicle exceeding the speed limit established for said GPS-indicated position, wherein a transmitter is configured to wirelessly transmit an alert signal to an external device located within said vehicle when said erratic driving events are detected, said external device being configured to relay said alert signal to a parent or caregiver.

2. The vehicle speed monitoring device set forth in claim 1, wherein said housing is made of at least one of stainless steel, aluminum, or a metal alloy.

3. The vehicle speed monitoring device set forth in claim 1, wherein said erratic driving events further include a medical emergency alert.

4. The vehicle speed monitoring device set forth in claim 1, wherein said central processing unit is at least one of a CPU of said vehicle, an external processor, or an additional processor within said vehicle.

5. The vehicle speed monitoring device set forth in claim 1, wherein said tracking device uses GPS technologies to determine said position of said vehicle and said speed limit established for said position.

6. The vehicle speed monitoring device set forth in claim 1, wherein said wire is a power cord and a data transmission wire.

7. A vehicle speed monitoring device, consisting of:
   a housing assembly including a housing having a top portion with a cylindrical shape and a bottom portion with a truncated cone shape extending from said top portion, a fastening member protruding perpendicu-larly outwardly from said top portion, said fastening member having a triangular bottom profile and a cir-cular opening on a distal end thereof, and a wire extending from said top portion adapted to connect with a central processing unit of a vehicle; and
   a sensing assembly disposed within said housing, said sensing assembly including a speed sensor and a track-ing device, said speed sensor being an induction sensor having an induction winding therein, said tracking device being configured to use GPS technologies to determine a position of said vehicle and a speed limit established for said position, wherein said fastening member is configured to fix said housing next to wheel hubs of said vehicle near brake rotors with a distal end of said bottom portion placed parallel to said wheel hub to permit measuring a speed of gears in a transmission system of said vehicle, wherein a central processing unit is configured to receive speed data from said speed sensor via said wire and location data from said track-ing device, said central processing unit further config-ured to apply reinforcement learning to learn driving patterns of said vehicle and compare said driving patterns with previous driving data to determine erratic driving events, said erratic driving events including at least one of reaching a predetermined speed, a prede-termined acceleration in a predetermined time, a pre-determined speed reduction in a predetermined time, a reduction of speed and no movement of the vehicle, and a speed of the vehicle exceeding the speed limit estab-lished for said GPS-indicated position, wherein a trans-mitter is configured to wirelessly transmit an alert signal to an external device located within said vehicle when said erratic driving events are detected, said external device being configured to relay said alert signal to a parent or caregiver, and wherein said housing is made of at least one of stainless steel, aluminum, or a metal alloy.

* * * * *